(12) United States Patent
Han

(10) Patent No.: US 7,548,389 B1
(45) Date of Patent: Jun. 16, 2009

(54) ASYMMETRY CORRECTION IN READ SIGNAL

(75) Inventor: Ke Han, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 11/868,932

(22) Filed: Oct. 8, 2007

Related U.S. Application Data

(63) Continuation of application No. 10/976,110, filed on Oct. 27, 2004, now Pat. No. 7,298,570.

(51) Int. Cl.
*G11B 5/35* (2006.01)
(52) U.S. Cl. .............................. 360/65; 360/25; 360/46
(58) Field of Classification Search .................. None
See application file for complete search history.

(56) References Cited

U.S. PATENT DOCUMENTS

| | | | | |
|---|---|---|---|---|
| 5,392,295 | A * | 2/1995 | Coker et al. ................. | 714/719 |
| 5,418,660 | A * | 5/1995 | Sato et al. ..................... | 360/65 |
| 5,585,975 | A | 12/1996 | Bliss | |
| 5,790,335 | A * | 8/1998 | Sugawara et al. ............. | 360/68 |
| 5,931,966 | A | 8/1999 | Carley | |
| 5,999,355 | A | 12/1999 | Behrens et al. | |
| 6,043,943 | A * | 3/2000 | Rezzi et al. ................... | 360/46 |
| 6,052,248 | A | 4/2000 | Reed et al. | |
| 6,141,167 | A | 10/2000 | Nishida et al. | |
| 6,201,832 | B1 * | 3/2001 | Choi ............................ | 375/233 |
| 6,332,205 | B1 * | 12/2001 | Conway ........................ | 714/746 |
| 6,385,239 | B1 * | 5/2002 | Okamoto et al. ............. | 375/232 |
| 6,400,518 | B1 * | 6/2002 | Bhaumik et al. .............. | 360/25 |
| 6,449,110 | B1 * | 9/2002 | DeGroat et al. ............... | 360/46 |
| 6,493,403 | B1 | 12/2002 | Askley et al. | |
| 6,519,103 | B2 | 2/2003 | Cyrusian | |
| 6,519,106 | B1 * | 2/2003 | Goh et al. ..................... | 360/65 |
| 6,529,340 | B2 * | 3/2003 | Gowda et al. ................. | 360/25 |
| 6,532,122 | B1 * | 3/2003 | Sugawara et al. ............. | 360/46 |
| 6,587,292 | B1 * | 7/2003 | Ashley et al. ................. | 360/46 |
| 6,597,650 | B2 * | 7/2003 | Katakura et al. ......... | 369/59.22 |
| 6,600,615 | B1 | 7/2003 | Ashley et al. | |
| 6,614,841 | B1 * | 9/2003 | Ohta .......................... | 375/232 |
| 6,678,110 | B2 | 1/2004 | Ellis | |
| 6,693,863 | B2 * | 2/2004 | Shoji et al. ............... | 369/47.35 |
| 6,714,603 | B2 | 3/2004 | Ashley et al. | |

(Continued)

OTHER PUBLICATIONS

U.S. Appl. No. 11/092,095, Ken Han.

(Continued)

*Primary Examiner*—Hoa T Nguyen
*Assistant Examiner*—Dismery E Mercedes

(57) ABSTRACT

Systems and techniques relating to interpreting signals on a channel having an asymmetrical signal amplitude response. A signal processor, such as a read channel transceiver device usable in a magnetic recording system, includes an asymmetry correction circuit configured to receive an analog signal and to compensate for asymmetry in the received analog signal, a signal equalizer configured to receive an input signal responsive to an output of the asymmetry correction circuit and to generate an equalized signal, a discrete time sequence detector operable to examine the equalized signal, and a control circuit that provides a coefficient adjustment to the asymmetry correction circuit to affect the asymmetry compensation based on an estimate of non-linearity derived from the equalized signal and an output of the discrete time sequence detector. The estimate can be a least mean squared estimate of the non-linearity in the equalized signal.

17 Claims, 4 Drawing Sheets

U.S. PATENT DOCUMENTS

| | | | |
|---|---|---|---|
| 6,735,724 B1 * | 5/2004 | McClellan | 714/704 |
| 6,798,832 B1 | 9/2004 | Nakata et al. | |
| 6,842,303 B2 | 1/2005 | Ichihara et al. | |
| 6,977,970 B2 | 12/2005 | Shim et al. | |
| 7,012,772 B1 * | 3/2006 | Vis | 360/46 |
| 7,061,848 B2 * | 6/2006 | Shim | 369/59.22 |
| 7,092,180 B2 | 8/2006 | Franck | |
| 7,215,631 B2 * | 5/2007 | Horibe et al. | 369/124.1 |
| 7,256,724 B2 * | 8/2007 | Lee | 341/169 |
| 7,298,570 B1 | 11/2007 | Han | |

OTHER PUBLICATIONS

Dismery E. Mercedes, Office Action mailed Apr. 11, 2007 in U.S. Appl. No. 11/092,095, to be published by U.S. Patent & Trademark Office.

Dismery E. Mercedes, Office Action mailed Sep. 13, 2007 in U.S. Appl. No. 11/092,095, to be published by U.S. Patent & Trademark Office.

Dismery E. Mercedes, Office Action mailed Mar. 31, 2008 in U.S. Appl. No. 11/092,095, to be published by U.S. Patent & Trademark Office.

* cited by examiner

ASYMMETRY CORRECTION IN READ SIGNAL

PRIORITY APPLICATIONS

This application is a continuation of and claims the benefit of the priority of U.S. patent application Ser. No. 10/976,110 filed Oct. 27, 2004, hereby incorporated by reference.

TECHNICAL FIELD

The present disclosure describes systems and techniques relating to signal processing, for example, interpreting readback signals obtained from a magnetic storage medium.

BACKGROUND

Signal processing circuits are frequently used to read storage media and interpret obtained analog signals as discrete values stored on the media. For magnetic storage media, a transducer head may fly on a cushion of air over a magnetic disk surface. The transducer converts magnetic field variations into an analog electrical signal. The analog signal is amplified, converted to a digital signal and interpreted (e.g., using maximum likelihood techniques, such as using a Viterbi detector). Tracking of stored data during a read operation is frequently performed using feedback or decision aided gain and timing control.

The head-media combination in typical magnetic recording systems has associated transfer characteristics that include an asymmetrical signal amplitude response, where an input signal having equivalent amplitudes on the positive and negative sides of the waveform results in an output signal having different amplitudes on the positive and negative sides of the waveform. Such amplitude asymmetry has been compensated for by adding to a readback signal an asymmetry adjustment signal, which is the readback signal squared and then scaled by a controlled asymmetry factor. The controlled asymmetry factor has previously been based on a comparison of the positive peak value with the negative peak value in the readback signal, which thus minimizes amplitude error at the peak values.

SUMMARY

The present disclosure includes systems and techniques relating to interpreting signals on a channel having an asymmetrical signal amplitude response. According to an aspect of the described systems and techniques, a signal processor, such as a read channel transceiver device usable in a magnetic recording system, includes an asymmetry correction circuit configured to receive an analog signal and to compensate for asymmetry in the received analog signal, a signal equalizer configured to receive an input signal responsive to an output of the asymmetry correction circuit and to generate an equalized signal, a discrete time sequence detector operable to examine the equalized signal, and a control circuit that provides a coefficient adjustment to the asymmetry correction circuit to affect the asymmetry compensation based on an estimate of non-linearity derived from the equalized signal and an output of the discrete time sequence detector.

The estimate can be a least mean squared estimate of the non-linearity in the equalized signal. The coefficient adjustment can include one or more values received by the asymmetry correction circuit to control the asymmetry compensation. These values can be coefficient values or coefficient adjustment values (e.g., a coefficient adjustment can be a coefficient value $q_{N,t+1}$ or a coefficient adjustment value $\mu \cdot (y_R - y_A) \cdot y_I^N$, when the one or more values are generated according to an equation, $q_{N,t+1} = q_{N,t} + \mu \cdot (y_R - y_A) \cdot y_I^N$, as described further below). The asymmetry correction circuit, the signal equalizer, the discrete time sequence detector and the control circuit can form a least a portion of a read channel in a storage access device, and the analog signal can be a readback signal obtained from a storage medium.

The described systems and techniques can result in improved asymmetry correction in a read channel of a storage device, allowing a larger portion of the dynamic range of the head-media combination to be used. Non-linearity observed on the digital side of a read channel, based on the target channel and least mean squared error techniques, can be used to provide a feedback signal that controls the asymmetry correction applied on the analog side of the read channel. The total output signal can be considered in optimizing one or more coefficients applied in an asymmetry correction circuit.

The systems and techniques described can employ a straight forward equation to calculate an error term for the adaptation of an asymmetry correction coefficient, and can be applied regardless of the particular type of target channel being used. Moreover, the asymmetry correction can be applied at multiple higher orders of non-linearity, allowing the asymmetry correction to be tailored to a particular target channel of interest.

Details of one or more implementations are set forth in the accompanying drawings and the description below. Other features, objects and advantages may be apparent from the description and drawings, and from the claims.

DRAWING DESCRIPTIONS

DETAILED DESCRIPTION

Figure 1:
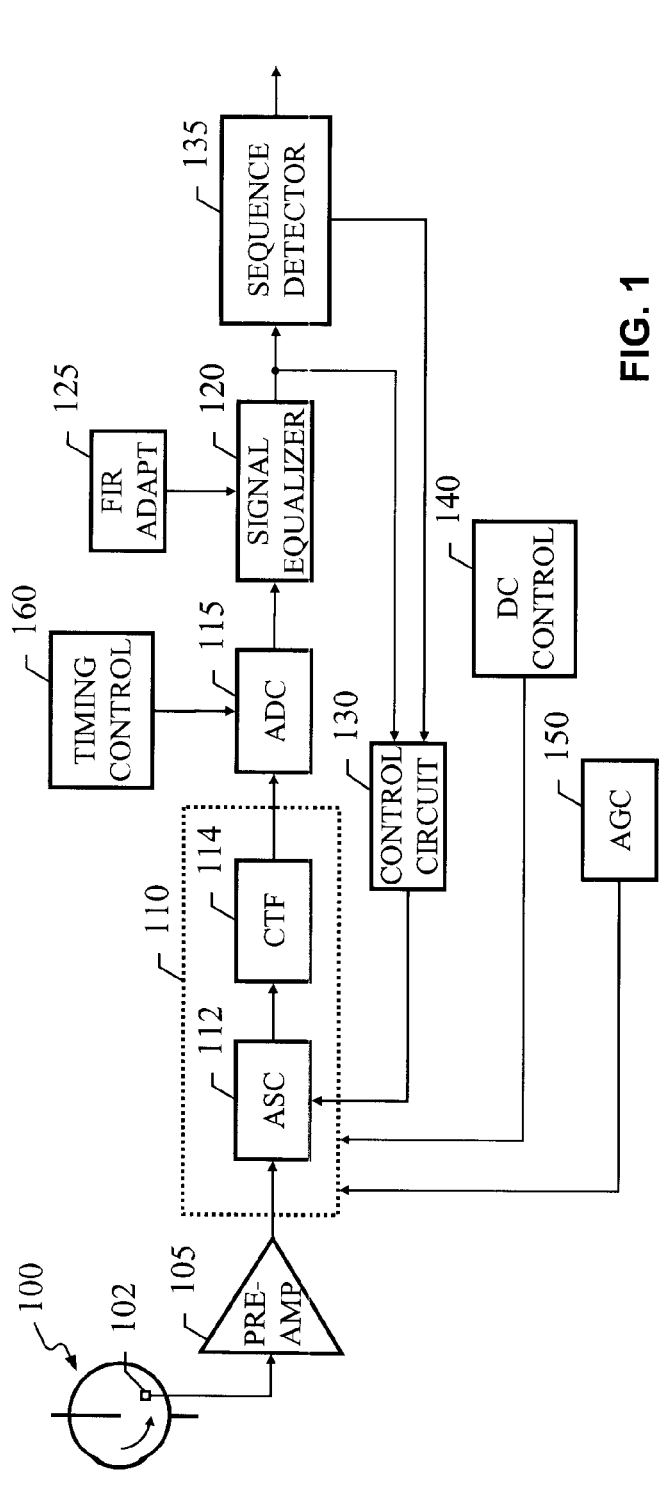
FIG. 1 is a block diagram showing a read channel in a storage system that performs amplitude asymmetry correction.

FIG. 1 is a block diagram showing a read channel in a storage system that performs amplitude asymmetry correction. The storage system includes a storage medium 100 and read head 102. The storage medium can be read-only or read/write media and can be magnetic-based, optical-based, semiconductor-based media, or a combination of these. Examples of the storage medium include hard disk platters in a hard disk drive, a floppy disk, a tape, and an optical disk (e.g., laser disk, compact disk, digital versatile disk). The storage medium is depicted in FIG. 1 as a disk for illustration only; the systems and techniques described herein can be used with other storage media types or in non-storage applications (e.g., communications equipment).

The read head 102 can be part of a read-write head assembly that reads the storage media 100 under the control of a servo or actuator. An analog readback signal is generated and can be sent to a pre-amplifier 105. The system can include an analog front end (AFE) 110, which can provide filtering and gain control. The AFE 110 can have inputs from both a DC control unit 140 and an automatic gain control (AGC) unit 150, and the AFE 110 can include a variable-gain amplifier (VGA), which can be regulated by the AGC 150.

The AFE 110 includes an asymmetry correction circuit (ASC) 112 configured to receive the analog readback signal and to compensate for asymmetry in the analog readback signal based on a coefficient adjustment received from a control circuit 130, such as a least mean squared (LMS) control circuit described below. The AFE 110 can also include a continuous time filter (CTF) 114.

An analog to digital converter (ADC) 115 converts the readback signal from continuous-time domain to discrete-time domain, and a signal equalizer 120 shapes the signal to a desired target response. The ADC 115 can be a 6-bit ADC. The signal equalizer 120 can be a finite impulse response (FIR) digital filter, such as a 9-tap or 10-tap FIR, which can be programmable or adaptive. For example, the system can include an FIR adaptation unit 125 that provides a control input to an FIR 120. Moreover, a CTF, ADC and FIR taken together can be viewed as the signal equalizer within the read channel.

A discrete time sequence detector 135 examines and interprets its input as discrete values stored on the media 100. Timing control circuitry, including a timing control unit 160 and/or a phase locked loop (PLL), can be used to regulate the filtered signal provided to the detector 135, and the DC control unit 140 can also apply a DC correction at one or more locations in the main read path. The sequence detector 135 can include one or more components, such as a Viterbi detector. The main read path can combine partial-response equalization with maximum-likelihood sequence detection (PRML) using a discrete-time approach (e.g., the class-IV partial response target (PR-IV)).

An output of the sequence detector 135 can be provided to a post processor, such as a media noise processor (MNP) that identifies and corrects errors in a detected sequence. As will be appreciated by those skilled in the relevant art, multiple components can be included after the component that obtains the binary sequence from the output of the signal equalizer, and these multiple components can be separate electronic components or integrated into a single sequence detector 135. For example, a single Viterbi detector component in a read channel can be used to obtain the binary sequence and also to reconstruct the ideal target channel output as described further below, or a Viterbi detector component can be used to obtain the binary sequence and another component, which is responsive to an output of the Viterbi detector component, can be used to reconstruct the ideal target channel output.

In general, an output of the sequence detector 135, such as an output coming directly from the sequence detector 135 or from a post processor, is provided to a control circuit 130. The control circuit 130 provides the coefficient adjustment to the ASC 112 to affect the asymmetry compensation based on an estimate of non-linearity derived from the equalized signal and the output of the discrete time sequence detector.

Figure 2:
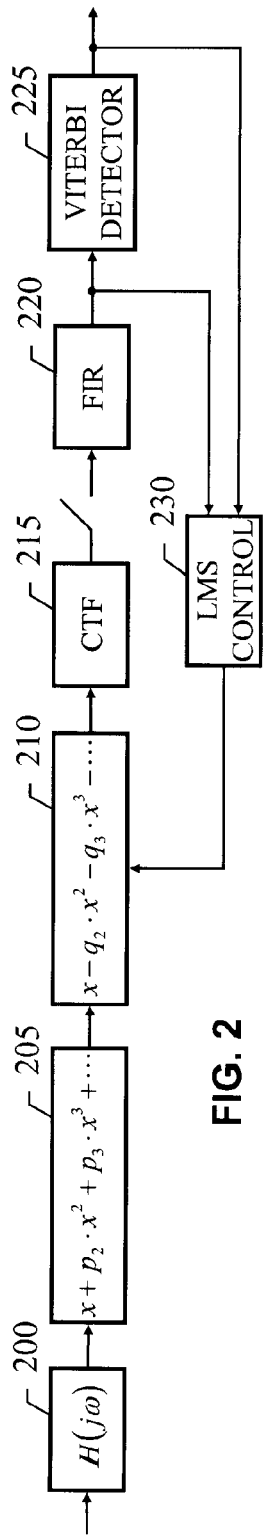
FIG. 2 is a block diagram illustrating the introduction of non-linearity in the readback signal and the subsequent compensation for this non-linearity.
Figure 3:
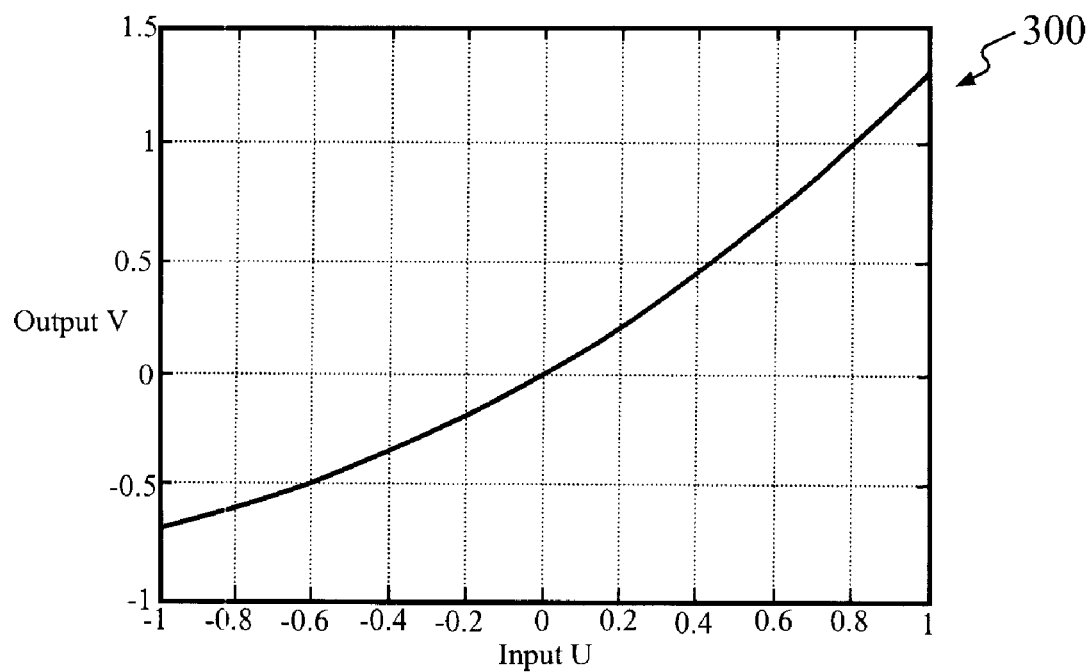
FIGS. 3 and 4 are graphs illustrating the non-linearity in the transfer characteristics of the head-media combination in a magnetic recording system and the corresponding non-linearity reflected at a finite impulse response (FIR) filter output.

FIG. 2 is a block diagram illustrating the introduction of non-linearity in the readback signal and the subsequent compensation for this non-linearity. $H(j\omega)$ 200 represents the transfer characteristics of the head-media combination, absent asymmetry. An asymmetry component 205 represents the asymmetry introduced by the head when reading the media. This asymmetry adds non-linear component(s) to the signal and can thus be represented by the following polynomial: $x+p_2 \cdot x^2 + p_3 \cdot x^3 + p_4 \cdot x^4 + \ldots$, where x is the readback signal, and $p_2, p_3, p_4, \ldots$ are the amounts of higher order non-linearity added to the signal. FIG. 3 shows a graph illustrating an example plot 300 of the transfer function for input U to output V. As illustrated, the second order term of the asymmetry polynomial is typically the most significant high order term.

An ASC 210 compensates for the asymmetry by applying an asymmetry correction based on a model of the asymmetry in the channel. This asymmetry correction can be represented by the following polynomial: $x - q_2 \cdot x^2 - q_3 \cdot x^3 - q_4 \cdot x^4 \ldots$, as shown in FIG. 2. The asymmetry correction employed by the ASC 210 can be limited to the second order $(x - q_2 \cdot x^2)$ or additional higher order terms can be included in the asymmetry correction. In general, one or more coefficients, $q_2, q_3, q_4, \ldots$, are adjusted so as to cancel the corresponding non-linear elements in the readback signal. The non-linearity introduced by the ASC 210 thus counteracts the non-linearity introduced into the readback signal by the head-media combination, before passing the readback signal on to a CTF 215.

The one or more coefficients can be decided adaptively, on the fly, to counteract non-linearity in the readback signal as it is observed. An LMS control circuit 230 can actively adjust the one or more coefficients used by the ASC 210 based on an estimate of non-linearity derived from the output of an FIR 220 and an output of a Viterbi detector 225. The FIR output provides a signal that reflects the non-linearity in the channel, and the Viterbi detector output can be used to reconstruct the ideal target channel output to calculate the error signal used. As noted above, this reconstruction can be performed by the Viterbi detector itself or another component responsive to an output of the Viterbi detector.

Figure 4:
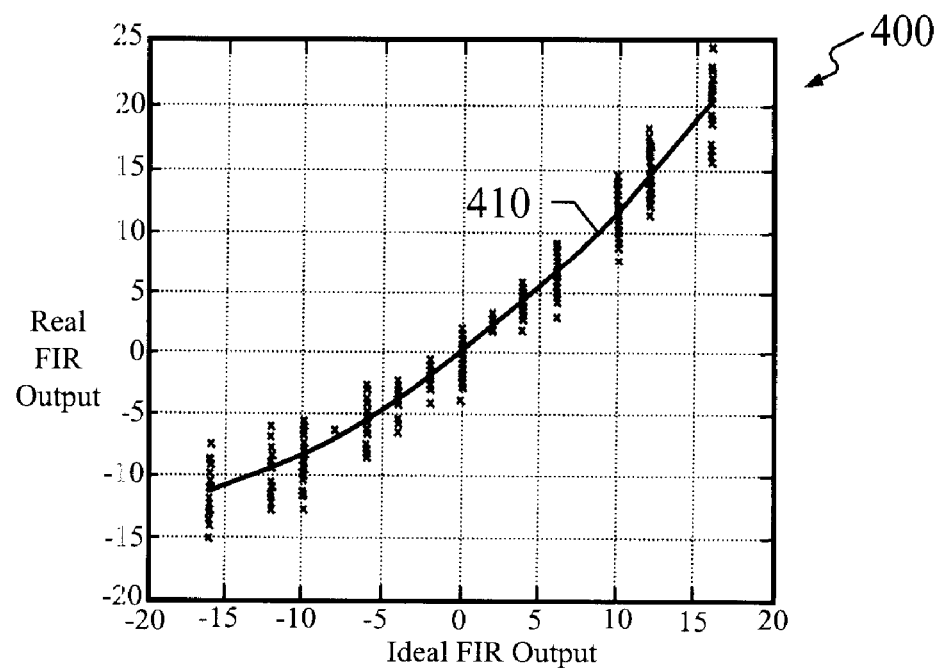

FIG. 4 shows a graph illustrating an example plot 400 of the asymmetry reflected at the FIR output without any asymmetry correction. As illustrated, the FIR output indicates the asymmetry in the signal and can thus be used to decide how adjustments to the asymmetry correction should be made to cancel that asymmetry. The example plot 400 shows ideal FIR output plotted against the real FIR output for a given target channel. Since asymmetry correction is the signal aspect being addressed here, the rest of the channel can be assumed to be ideal (e.g., any additive white noise can be disregarded because it does not affect the asymmetry processing being described), and the FIR equalizer can be assumed to be doing a perfect job in equalizing the signal to the target.

Thus, the relationship between the input and the output of the read channel can be defined by the target polynomial for the read channel. Based on that target polynomial, the ideal output of the FIR can be determined, as illustrated in FIG. 4. The non-linearity in the read channel can be seen by fitting a curve 413 to the data in FIG. 4, such as by minimizing the mean squared error. This curve 410 characterizes the relationship between the real output and the ideal output and directly reflects the non-linearity in the channel.

If there is a second order non-linearity in the readback signal due to a magnetic recording (MR) head, this is reflected as a second order non-linearity at the FIR output, and likewise for third, fourth or higher non-linearity in the readback signal. The non-linearity reflected at the FIR output may not be of the same magnitude as that introduced by the MR head, but will be of the same trend. This information from the FIR output indicates when non-linearity remains in the channel, and can thus be used to adjust the asymmetry correction.

The non-linearity in the FIR output can be modeled by the following asymmetry polynomial, $y_A = \alpha \cdot y_I + \beta \cdot y_I^2 + x \cdot y_I^3 + C$, where $y_I$ is the ideal channel output given by the linear target polynomial, and $y_A$ is the real output according to the asymmetry model. Using this model, the coefficients of the asymmetry polynomial can be determined and used to adjust the asymmetry correction. Although only terms up to the third order are considered here, higher order terms can be added and addressed in the same manner.

To determine the coefficients, an error signal is defined according to the following equation, $e=y_R-y_A$, where $y_A$ models the non-linearity in the channel, and $y_R$ is the real FIR output. Non-linearity in the readback signal can thus be removed by making $y_A$ as close to $y_R$ as possible in the sense of least mean squared error. With this error signal defined, the coefficients used by the ASC can be adjusted using standard least mean squared error criteria based on the square of the error signal.

One or more gradients can be defined, and the coefficients of the asymmetry polynomial can be adjusted accordingly:

$$\frac{\partial e^2}{\partial \alpha} = -e \cdot y_I \Longrightarrow \alpha_{t+1} = \alpha_t + \mu \cdot e \cdot y_I \quad (1)$$

$$\frac{\partial e^2}{\partial \beta} = -e \cdot y_I^2 \Longrightarrow \beta_{t+1} = \beta_t + \mu \cdot e \cdot y_I^2 \quad (2)$$

$$\frac{\partial e^2}{\partial \chi} = -e \cdot y_I^3 \Longrightarrow \chi_{t+1} = \chi_t + \mu \cdot e \cdot y_I^3 \quad (3)$$

where $\mu$ is a step size in the adjustment of the coefficient. Note that $\mu$ may be a function of the order of the adjustment (i.e., a different step size $\mu_N$ for each coefficient $q_N$), or a common step size used at all orders of adjustment. Additionally, $\mu$ may be an implicit parameter in a system and not expressly defined.

This technique can determine the non-linearity at the FIR output and can be directly applied to the adjustment of the coefficients in the ASC. The asymmetry correction can be made stronger or weaker as needed based on the non-linearity observed at the FIR output. For example, the updating equation for $\beta$ can be applied directly to the second order correcting term in the asymmetry correction imparted by the ASC. Thus, the overall mean squared error value(s) can be minimized to thereby optimize the coefficient(s) in the ASC.

Figure 5:
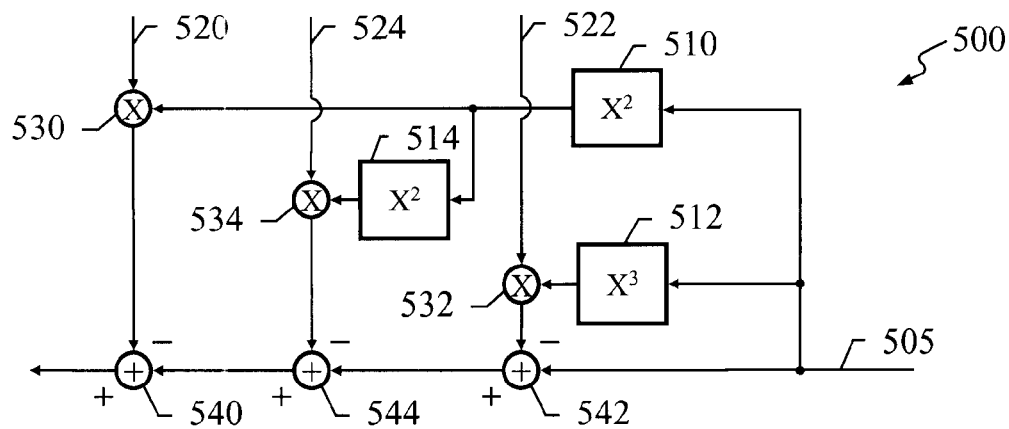
FIG. 5 is a block diagram illustrating an example asymmetry correction circuit (ASC).

FIG. 5 is a block diagram illustrating an example ASC 500. The ASC 500 is implemented in an analog circuit in the continuous time domain. The ASC 500 adjusts the readback signal 505 by feeding it through a series of multipliers to obtain adjusted signals that are then added back into the readback signal 505.

For the second order adjustment, a squaring circuit 510 squares the signal 505, a multiplier circuit 530 mixes the squared signal with a second order coefficient value 520, and the result is combined with the readback signal 505 in an adder circuit 540. For the third order adjustment, a cubing circuit 512 cubes the signal 505, a multiplier circuit 532 mixes the cubed signal with a third order coefficient value 522, and the result is combined with the readback signal 505 in an adder circuit 542. For the fourth order adjustment, a squaring circuit 514 squares the signal from the squaring circuit 510, a multiplier circuit 534 mixes the quadrupled signal with a fourth order coefficient value 524, and the result is combined with the readback signal 505 in an adder circuit 544.

Figure 6:
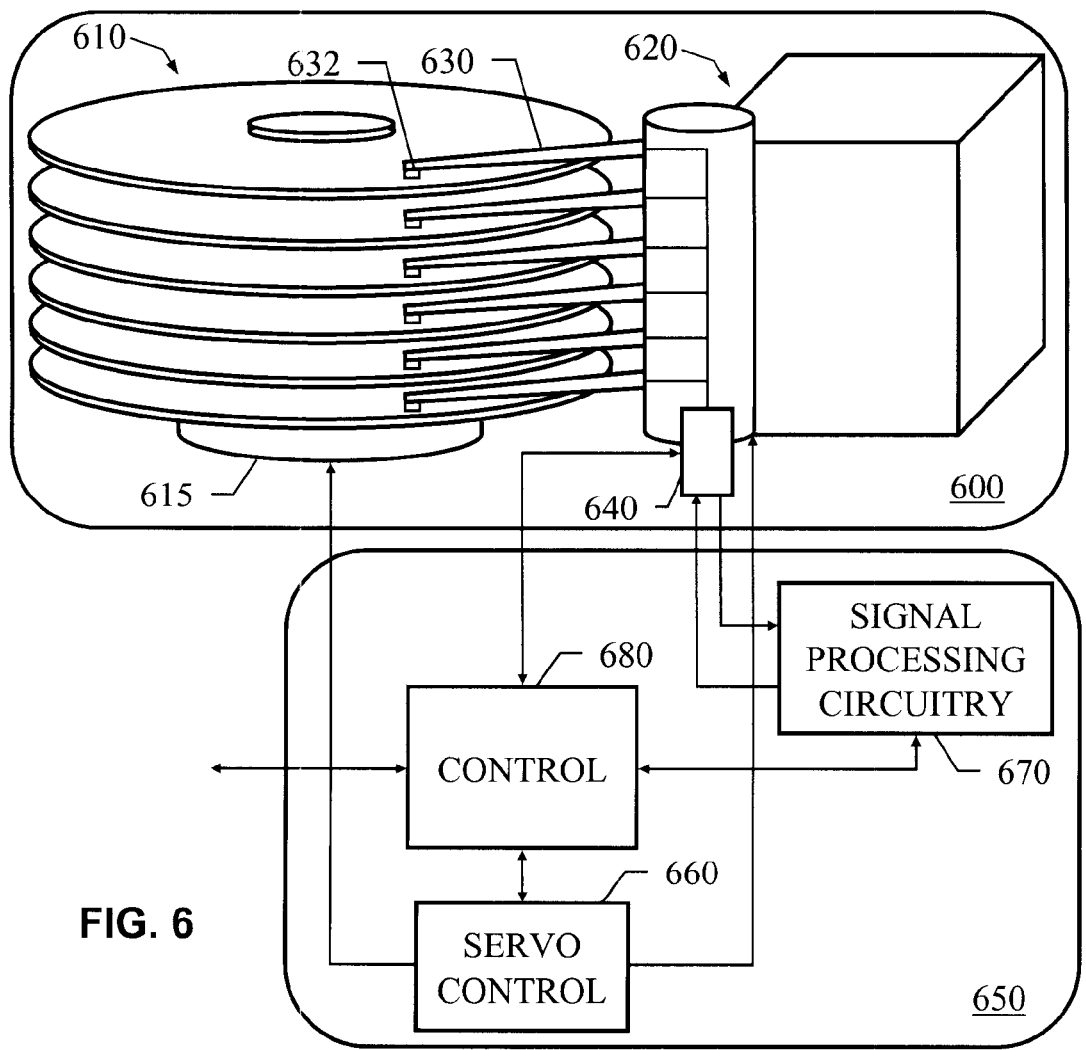
FIG. 6 is a block diagram showing a magnetic-media disk drive that employs amplitude asymmetry correction as described.

The signal processor components described can be implemented as one or more devices, such as one or more integrated circuit (IC) devices, in a storage device. FIG. 6 is a block diagram showing a magnetic-media disk drive that employs amplitude asymmetry correction as described. The disk drive includes a head-disk assembly (HDA) 600 and drive electronics 650 (e.g., a printed circuit board (PCB) with semiconductor devices). The HDA 600 includes one or more disks 610 mounted on an integrated spindle and motor assembly 615. The spindle and motor assembly 615 rotates the disk(s) 610 under read-write head(s) connected with a head assembly 620 in the HDA 600. The disk(s) 610 can be coated with a magnetically hard material (e.g., a particulate surface or a thin-film surface) and can be written to, or read from, a single side or both sides of each disk.

A head 632 on an arm 630 can be positioned as needed to read data on the disk. A motor (e.g., a voice coil motor or a stepper motor) can be used to position the head over a desired track. The arm 630 can be a pivoting or sliding arm and can be spring-loaded to maintain a proper flying height for the head 632 in any drive orientation. A closed-loop head positioning system can be used.

The HDA 60C can include a read-write chip 640, where head selection and sense current value(s) can be set. The read-write chip 640 can amplify a readback signal before outputting it to signal processing circuitry 670. The signal processing circuitry 670 can include a readback signal circuit, a servo signal processing circuit, and a write signal circuit.

Signals between the HDA 600 and the drive electronics 650 can be carried through a flexible printed cable. A controller 680 can direct a servo controller 660 to control mechanical operations, such as head positioning through the head assembly 620 and rotational speed control through the motor assembly 615. The controller 680 can be one or more IC chips (e.g., a combo chip). The controller 680 can be a microprocessor and a hard disk controller. The drive electronics 650 car also include various interfaces, such as a host-bus interface, and memory devices, such as a read only memory (ROM) for use by a microprocessor, and a random access memory (RAM) for use by a hard disk controller. The hard disk controller can include error correction circuitry.

The HDA 600 and drive electronics 650 can be closed in a sealed container with an integral air filter. For example, the hard disk drive can be assembled using a Winchester assembly. The rotating platter can be driven by a brush-less DC motor, and the rotational frequency can be accurately servo-locked to a crystal reference.

Figure 7:
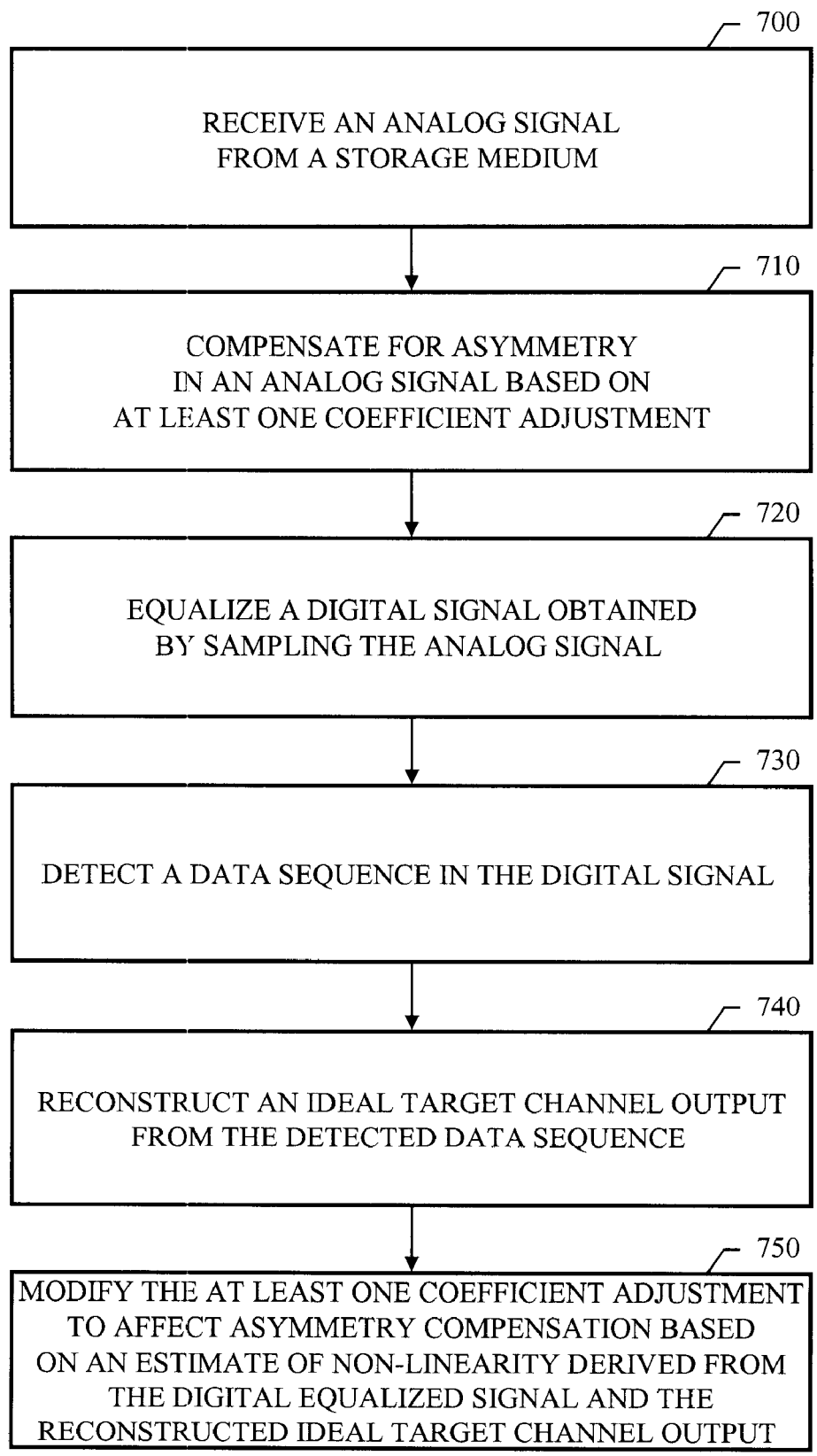
FIG. 7 is a flowchart illustrating a process of asymmetry correction as can be performed in a storage system.

FIG. 7 is a flowchart illustrating a process of asymmetry correction as can be performed in a storage system. This process, and all of the functional operations described in this specification, can be implemented in electronic circuitry, or in computer hardware, firmware, software, or in combinations of them, such as the structural means disclosed in this specification and structural equivalents thereof, including potentially a software program operable to cause one or more machines to perform the operations described. It will be appreciated that the order of operations presented is shown only for the purpose of clarity in this description. No particular order is required for these operations, and all of the operations can occur simultaneously.

An analog signal is received from a storage medium at 700. Asymmetry in the analog signal is compensating for based on at least one coefficient adjustment at 710. Compensating for the asymmetry in the analog signal can be based on at least two coefficient adjustments, at least three adjustments, or at least four coefficient adjustments.

A digital signal obtained by sampling the analog signal is equalized at 720. A data sequence is detected in the digital signal at 730. An ideal target channel output is reconstructed from the detected data sequence at 740. The at least one coefficient adjustment is modified to affect the asymmetry compensation based on an estimate of non-linearity derived from the digital equalized signal and the reconstructed ideal target channel output at 750.

The estimate can be a least mean squared estimate of the non-linearity in the equalized digital signal. Moreover, the one or more coefficient adjustments can be generated according to an equation, $q_{N,t+1} = q_{N,t} + \mu \cdot (y_R - y_A) \cdot y_I^N$, where $q_{N,t}$ is an asymmetry correction coefficient of order N at time t from one or more asymmetry correction coefficients, $\mu$ is a step size, $y_R$ corresponds to the equalized digital signal, $y_I$ corresponds to the reconstructed ideal target channel output, and $y_A$ corresponds to an estimated real equalized channel output with asymmetry taken into account, $y_A$ being derived utilizing the reconstructed ideal target channel output and the one or more asymmetry correction coefficients.

A few embodiments have been described in detail above, and various modifications are possible. Thus, other embodiments may be within the scope of the following claims.

What is claimed is:

1. An apparatus comprising:
   an asymmetry correction circuit configured to receive an analog signal and to compensate for asymmetry in the received analog signal;
   a signal equalizer configured to receive an input signal responsive to an output of the asymmetry correction circuit and to generate an equalized signal;
   a discrete time sequence detector operable to examine the equalized signal; and
   a control circuit that provides a coefficient adjustment to the asymmetry correction circuit to affect the asymmetry compensation;
   wherein the coefficient adjustment is based on a correlation between an estimated ideal channel output and an error signal, the estimated ideal channel output being derived from an output of the discrete time sequence detector, and the error signal being derived from the equalized signal and an estimated real equalized channel output with asymmetry taken into account.

2. The apparatus of claim 1, wherein the coefficient adjustment comprises a least mean squared estimate of non-linearity in the equalized signal.

3. The apparatus of claim 1, wherein the coefficient adjustment comprises at least second, third and fourth order coefficient adjustment values, and the asymmetry correction circuit comprises a squaring circuit, a cubing circuit, multiplier circuits, and adder circuits.

4. The apparatus of claim 1, wherein the discrete time sequence detector comprises a Viterbi detector.

5. The apparatus of claim 1, comprising a continuous time filter responsive to the output of the asymmetry correction circuit and an analog to digital converter (ADC) responsive to an output of the continuous time filter, wherein the signal equalizer comprises a finite impulse response (FIR) digital filter, the input signal of the FIR digital filter being responsive to an output of the ADC.

6. The apparatus of claim 1, wherein the asymmetry correction circuit, the signal equalizer, the discrete time sequence detector and the control circuit comprise at least a portion of a read channel in a storage access device, and the analog signal comprises a readback signal obtained from a storage medium.

7. A system comprising:
   a storage medium;
   a head assembly operable to obtain an analog signal from the storage medium;
   an asymmetry correction circuit configured to receive the analog signal and to compensate for asymmetry in the received analog signal;
   a signal equalizer configured to receive an input signal responsive to an output of the asymmetry correction circuit and to generate an equalized signal;
   a discrete time sequence detector operable to examine the equalized signal; and
   a control circuit that provides a coefficient adjustment to the asymmetry correction circuit to affect the asymmetry compensation;
   wherein the coefficient adjustment is based on a correlation between an estimated ideal channel output and an error signal, the estimated ideal channel output being derived from an output of the discrete time sequence detector, and the error signal being derived from the equalized signal and an estimated real equalized channel output with asymmetry taken into account.

8. The system of claim 7, wherein the storage medium comprises a magnetic storage medium.

9. The system of claim 7, wherein the coefficient adjustment comprises a least mean squared estimate of non-linearity in the equalized signal.

10. The system of claim 7, wherein the coefficient adjustment comprises at least second, third and fourth order coefficient adjustment values, and the asymmetry correction circuit comprises a squaring circuit, a cubing circuit, multiplier circuits, and adder circuits.

11. The system of claim 7, wherein the discrete time sequence detector comprises a Viterbi detector.

12. The system of claim 7, comprising a continuous time filter responsive to the output of the asymmetry correction circuit and an analog to digital converter (ADC) responsive to an output of the continuous time filter, wherein the signal equalizer comprises a finite impulse response (FIR) digital filter, the input signal of the FIR digital filter being responsive to an output of the ADC.

13. A method comprising:
   compensating for asymmetry in an analog signal based on at least one coefficient adjustment;
   equalizing a digital signal obtained by sampling the analog signal;
   detecting a data sequence in the equalized digital signal;
   reconstructing an ideal target channel output from the detected data sequence; and
   modifying the at least one coefficient adjustment to affect the asymmetry compensation based on a correlation between the reconstructed ideal target channel output and an error signal derived from the equalized digital signal and the detected data sequence.

14. The method of claim 13, wherein the modifying comprises generating a least mean squared estimate of non-linearity in the equalized digital signal.

15. The method of claim 13, wherein compensating for the asymmetry comprises compensating for the asymmetry in the analog signal based on at least two coefficient adjustments corresponding to higher order non-linearity components of the analog signal.

16. The method of claim 13, wherein the detecting comprises performing Viterbi detection.

17. The method of claim 13, comprising receiving the analog signal from a storage medium.

* * * * *